(12) United States Patent
Lacarnoy

(10) Patent No.: US 8,598,749 B2
(45) Date of Patent: Dec. 3, 2013

(54) CONVERTER DEVICE AND UNINTERRUPTIBLE POWER SUPPLY EQUIPPED WITH SUCH A DEVICE

(75) Inventor: Alain Lacarnoy, Saint Nazaire les Eymes (FR)

(73) Assignee: MGE UPS, Saint Ismier (FR)

( * ) Notice: Subject to any disclaimer, the term of this patent is extended or adjusted under 35 U.S.C. 154(b) by 466 days.

(21) Appl. No.: 12/929,363

(22) Filed: Jan. 19, 2011

(65) Prior Publication Data

US 2011/0193412 A1 Aug. 11, 2011

(30) Foreign Application Priority Data

Feb. 5, 2010 (FR) ...................................... 10 00469

(51) Int. Cl.
*H01H 9/54* (2006.01)
(52) U.S. Cl.
USPC .......................................... 307/140; 307/151
(58) Field of Classification Search
USPC .................................................. 307/140, 151
See application file for complete search history.

(56) References Cited

U.S. PATENT DOCUMENTS

| 6,838,925 B1 | 1/2005 | Nielsen .......................... 327/391 |
| 8,130,524 B2 * | 3/2012 | Lee et al. ........................ 363/132 |
| 2007/0109824 A1 | 5/2007 | Romenesko ...................... 363/41 |

* cited by examiner

*Primary Examiner* — Robert L. DeBeradinis
(74) *Attorney, Agent, or Firm* — Steptoe & Johnson LLP

(57) ABSTRACT

A converter to supply an AC voltage on a modulated signal output, having two switching units each provided with a DC voltage input and a switching output to supply pulses varying between the voltage on the input in a first switched state, and a reference voltage in a second switched state, each switching unit comprising a first switch connected between the input and the switching output to establish the first switched state, and for each switching unit, a second switch connected between the switching output and the modulated signal output to activate that switching unit, and a third switch connected between the input of that switching unit and the modulated signal output. The converter may be a part of an uninterruptible power supply.

14 Claims, 10 Drawing Sheets

CONVERTER DEVICE AND UNINTERRUPTIBLE POWER SUPPLY EQUIPPED WITH SUCH A DEVICE

BACKGROUND OF THE INVENTION

The invention relates to the field of converters such as inverters, for example those used in uninterruptible power supplies, in particular in high-power uninterruptible power supplies, i.e. with a power generally comprised between about 100 and 500 kVA.

The invention relates more particularly to a converter device enabling an AC voltage VS and current IS to be supplied by filtering pulses obtained on a modulated signal output SM from three substantially DC voltages −U/2, UREF, U/2 available on a reference voltage line REF and on two DC voltage inputs P, N of opposite signs respectively from two switching units UC1, UC4, each switching unit comprising a switching output S1, S4 to provide pulses having an amplitude varying between the voltage on the input of said switching unit, in a first switched state of said switching unit, and the voltage on said reference voltage line in a second switched state of said switching unit, each switching unit comprising a first switch T1, T4 connected between the input and the switching output S1, S4 of said switching unit to establish said first switched state by turn-on of said first switch, said device comprising a second switch T2, T3, for each switching unit, associated with said switching unit, connected between said switching unit and said modulated signal output to activate said switching unit by turn-on of said second switch.

The invention also relates to an uninterruptible power supply 101 comprising a power supply input 102 on which an AC input voltage is applied, a rectifier 103 connected to said input, two substantially DC voltage lines of opposite signs connected on output of said rectifier, and an inverter 106 connected to said voltage lines of substantially DC voltage and comprising an output 107 designed to supply a secured voltage.

STATE OF THE ART

Inverters are being developed to improve their efficiency and to reduce noise annoyance generated by switching frequencies that are often low, around a few thousand hertz. In this context, it has been shown that it was interesting to use inverters presenting topologies on several levels, generally three levels.

With reference to FIG. 1, the three-level inverter according to the prior art represented under reference number 1 supplies an AC voltage VS and current IS on a phase line. AC voltage VS and current IS are obtained by filtering pulses obtained on a modulated signal output SM from three substantially DC voltage levels −U/2, UREF, U/2 available on a reference voltage line REF and on two voltage sources of opposite signs connected to the inputs P, N of the switching units described in the following. The filtering means used comprise an inductance L connected between the modulated signal output SM and the AC voltage VS and current IS output. The filtering means generally comprise a capacitor C, not represented, which is connected between the AC voltage VS output and a reference voltage point presenting the same electric potential as the reference voltage line REF.

The inverter represented in FIG. 1 comprises two switching units UC1, UC4 controlled by a control unit, not represented. The switching units respectively comprise a positive DC voltage input P and a negative DC voltage input N connected to the respectively positive and negative voltage sources. Each switching unit UC1, UC4 is connected on one side to the voltage source corresponding to one or the other of said inputs P, N and to the reference voltage line REF, and on the other side to the modulated signal output SM. Each switching unit UC1, UC4 comprises a first switch provided with a transistor T1, T4 connected between the voltage input P, N of said switching unit and the modulated signal output SM. On turn-on of the transistor T1, T4 of a switching unit UC1, UC4, the voltage on the modulated signal output SM is substantially equal to the DC voltage +U/2, −U/2 of the voltage input P, N of said switching unit. This on state of the transistor T1, T4 corresponds to a first switched state of the switching unit UC1, UC4. In this first switched state, the transistor T1, T4 can transfer the power from the input P, N to the modulated signal output SM. When the transistor T1, T4 is turned-off, second switches T2, T3 described in the following enable the voltage on the modulated signal output SM to switch to a value substantially equal to the reference voltage, which corresponds to a second switched state of switching unit UC1, UC4.

For each switching unit UC1, UC4, the inverter represented in FIG. 1 further comprises the second switch referred to above. This second switch is provided with a transistor T2, T3 connected between said switching unit and the modulated signal output SM. The transistor T2, T3 of each switching unit UC1, UC4, when it is turned-on, essentially activates switching of said switching unit according to the sign of the AC voltage VS. The transistor T2, T3 of each switching unit UC1, UC4 among other things activates switching from the first switched state to a second switched state of said switching unit when the AC voltage VS is of the same sign as the voltage available on the input P, N of said switching unit.

Each switching unit UC1, UC4 further comprises a diode DH, DB connected between the reference voltage line REF and the modulated signal output SM. More precisely, the transistor T2, T3 and diode DH, DB of each switching unit are connected in series between the reference voltage line REF and the modulated signal output SM. Diode DH, DB of each switching unit UC1, UC4 enables switching from the first switched state to the second switched state, on turn-off of transistor T1, T4. This second switched state associated with turn-off of transistor T1, T4, when transistor T2, T3 is on, enables a voltage substantially equal to the reference voltage UREF to be obtained on the modulated signal output SM. In this way, when said switching unit is activated, transistor T1, T4 of each switching unit UC1, UC4 provides pulses, on the modulated signal output SM, having an amplitude varying between a value of the voltage on the input of said switching unit in a first switched state of said switching unit, and a value of the voltage on the reference voltage line in a second switched state of said switching unit. It is noteworthy that these pulses present the same sign as that of the voltage available on the voltage input P, N of the switching unit involved.

The transistors T1, T2, T3, T4 of the first and second switches are generally insulated gate bipolar transistors IGBT which are generally used in electronic power switches. Each of these switches comprises a diode D1, D2, D3, D4 connected in parallel on transistor T1, T2, T3, T4 of said switch and directed so as to be turned-on when said transistor is reverse-biased. These diodes D1, D2, D3, D4 enable operation of the converter device during the reactive phases, i.e. when AC voltage VS and AC current IS are of opposite signs.

When the converter device of FIG. 1 is implemented, when first switch T1 of switching unit UC1 is open, i.e. when transistor T1 of said first switch is off, opening of the first switch T4 of switching unit UC4 results in a voltage drop at the terminals of first switch T1 substantially equal to the potential difference U between the inputs P, N of switching units UC1, UC4. This means that the voltage rating of the transistors of first switches T1, T4 has to be chosen higher than this potential difference U. In the case where the potential difference U/2 between each input P, N and the reference line is greater than 300 Volts, the first switches, i.e. transistors T1, T4, therefore have to have a voltage rating of more than 600 Volts, i.e. generally a voltage rating of 1200 Volts.

With reference to FIG. 2 according to the prior art, the three-level inverter represented under reference number 11 essentially comprises the same components as the one represented in FIG. 1, but these elements are arranged differently. Compared with the inverter 1 represented in FIG. 1, the inverter 11 enables the rating of first switches T1, T4 to be reduced. In this set-up, switching units UC1, UC4 are arranged differently and comprise switching outputs S1, S4 distinct from modulated signal output SM. The first switch, i.e. transistor T1, T4, of each switching unit UC1, UC4 is connected between the input P, N and the switching output S1, S4 of said switching unit. The first switched state is established by closing of the first switch, i.e. by turn-on of transistor T1, T4 of said first switch. Diode DH, DB of each switching unit UC1, UC4 is connected between the reference voltage line REF and the switching output S1, S4 of said switching unit to establish the second switched state when the first switch is open, i.e. when transistor T1, T4 of the first switch is off. Diode DH, DB of each switching unit UC1, UC4 thereby enables a voltage equal to the reference voltage to be established on switching output S1, S4 of said switching unit, when opening of first switch T1, T4 takes place. Second switch T2, T3 associated with switching unit UC1, UC4 is connected between said switching unit and the modulated signal output SM, and enables said switching unit to be activated by turn-on of said second switch. More precisely, second switch T2, T3 associated with switching unit UC1, UC4 is connected between switching output S1, S4 of said switching unit and the modulated signal output SM. What is meant by activating a switching unit is transferring the pulses from switching output S1, S4 of said switching units to the modulated signal output SM.

When switching unit UC1, UC4 of the inverter of FIG. 2 is in the first switched state corresponding to closing of first switch T1, T4 and when said switching unit is activated by turn-on of second switch T2, T3, first switch T1, T4 transfers the power available on input P, N of said switching unit to the modulated signal output SM. However, this power is transferred to not only via first switch T1, T4 but also via second switch T2, T3. This results in the voltage drops in these two components being maintained throughout the whole of the first switched state, which leads to consequent power losses.

U.S. Pat. No. 6,838,925 describes an inverter presenting a similar architecture to that of the converter device represented in FIG. 2 in which the first switches are provided with MOS field effect transistors which present better switching performances than the transistors used in the inverters represented in FIGS. 1 and 2. However, this type of transistor is not suitable for transfer of a power comprised between 100 and 500 kVA. Furthermore, implementation of such a device also leads to power losses generated by the voltage drops in both the first and second switches during power transfers between the DC voltage inputs and the modulated signal output.

SUMMARY OF THE INVENTION

The object of the invention is to provide a solution to the problems of inverters of the prior art by proposing a converter device enabling an AC voltage and current to be supplied by filtering pulses obtained on a modulated signal output from three substantially DC voltages available on a reference voltage line and on two DC voltage inputs of opposite signs from respectively two switching units, each switching unit comprising a switching output to provide pulses having an amplitude varying between the voltage on the input of said switching unit, in a first switched state of said switching unit, and the voltage on said reference voltage line in a second switched state of said switching unit, each switching unit comprising a first switch connected between the input and the switching output of said switching unit to establish said first switched state by closing said first switch, said device, for each switching unit, comprising a second switch associated with said switching unit, connected between said switching unit and said modulated signal output to activate said switching unit by closing of said second switch, said converter device being characterized in that, for each switching unit, it comprises a third switch connected between the input of said switching unit and the modulated signal output, said first switch being controlled in such a way as to switch from the first switched state to the second switched state, in one direction or the other, keeping said third switch open, said third switch being controlled to be closed during at least a part of the duration of said first switched state.

Each switching unit preferably further comprises a diode connected between the reference voltage line and the switching output of said switching unit to establish the second switched state when the first switch is open.

Alternatively, each switching unit further comprises a fourth switch connected between the reference voltage line and the switching output of said switching unit to establish the second switched state when the first switch is open. Advantageously, the fourth switch of each switching unit is provided with a transistor and a diode connected in parallel on said transistor and directed so as to be on when said transistor is reverse-biased.

The second switch associated with each switching unit is preferably arranged between the switching output of said switching unit and the modulated signal output.

The first, second and third switches preferably comprise transistors. Advantageously, the first, second and third switches comprise diodes connected in parallel with respectively each of the transistors of said switches and directed so as to be on when said transistor is reverse-biased.

According to one embodiment, the transistors of the first, second and third switches are insulated gate bipolar transistors IGBT According to one embodiment, the transistors of the first switches are silicon carbide field effect transistors, and the second and third switches comprise diodes connected in parallel with respectively each of the transistors of said switches and directed so as to be on when said transistor is reverse-biased.

According to one embodiment, the transistor of the first switch of each switching unit is a MOS field effect transistor, the second switch associated with said switching unit comprising series-connected several diodes in parallel with the transistor of said second switch and directed so as to be on when said transistor is reverse-biased.

According to one embodiment, the converter device comprises a fifth switch connected between the reference voltage line and the modulated signal output. The fifth switch preferably comprises two MOS field effect transistors connected in series and directed so as to conduct the current in opposite directions, said fifth switch comprising, for each of said two transistors, a diode connected in parallel on said transistor and directed so as to be on when said transistor is reverse-biased.

The converter device preferably comprises, for each switching unit:

first control means acting on the first switch of said switching unit to close or open said first switch to switch from the first switched state to the second switched state, in one direction or the other, keeping the third switch open second control means acting on the third switch of said switching unit to close said third switch after switching from the second switched state to the first switched state.

The invention also relates to an uninterruptible power supply comprising a power supply input on which an AC input voltage is applied, a rectifier connected to said input, two substantially DC voltage lines of opposite signs connected on output from said rectifier, an inverter connected to said substantially DC voltage lines and comprising an output designed to supply a secured voltage, said power supply being characterized in that said inverter is a device as described in the foregoing and supplying a secured AC voltage from the substantially DC voltages.

BRIEF DESCRIPTION OF THE DRAWINGS

Other advantages and features will become more clearly apparent from the following description of particular embodiments of the invention, given for non-restrictive example purposes only and represented in the appended drawings.

DETAILED DESCRIPTION OF AN EMBODIMENT

Figure 2:
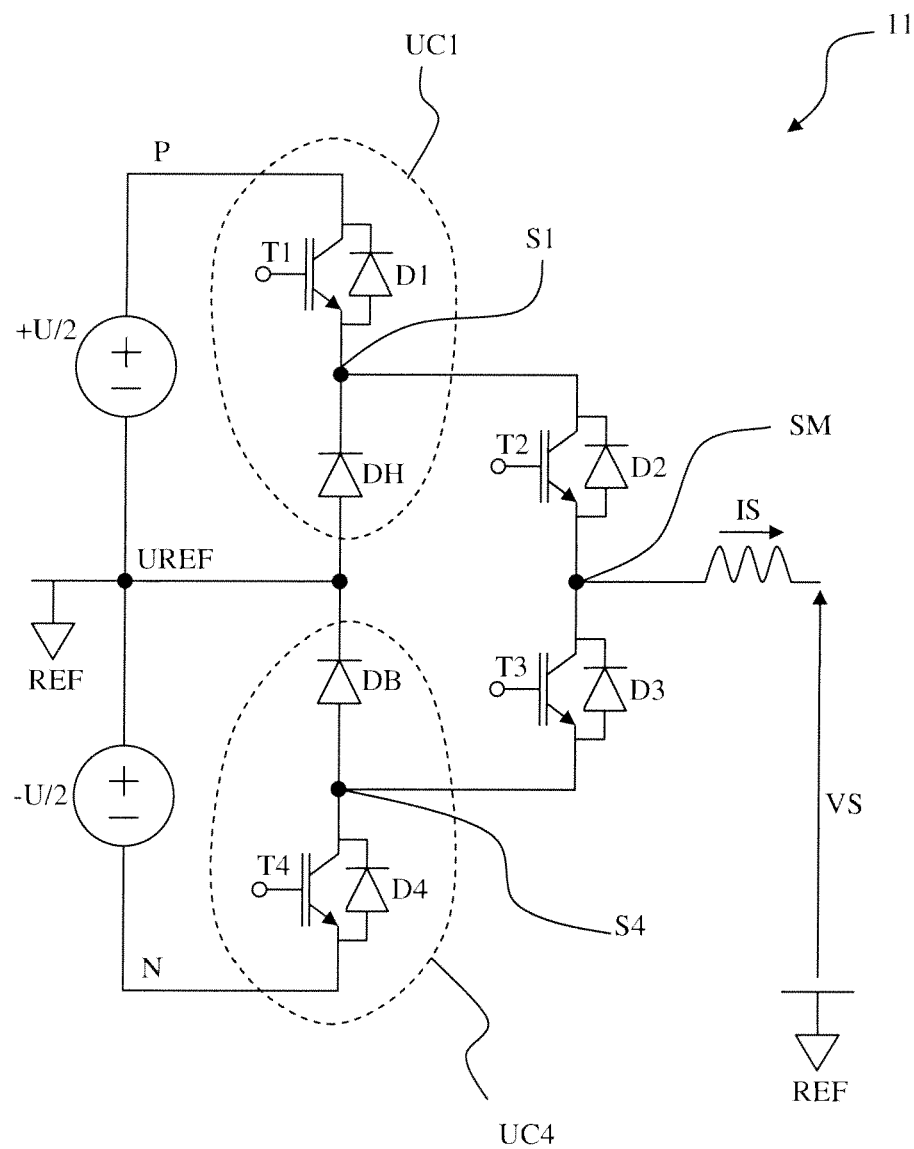
FIG. 2 represents another converter device according to the prior art.
Figure 3:
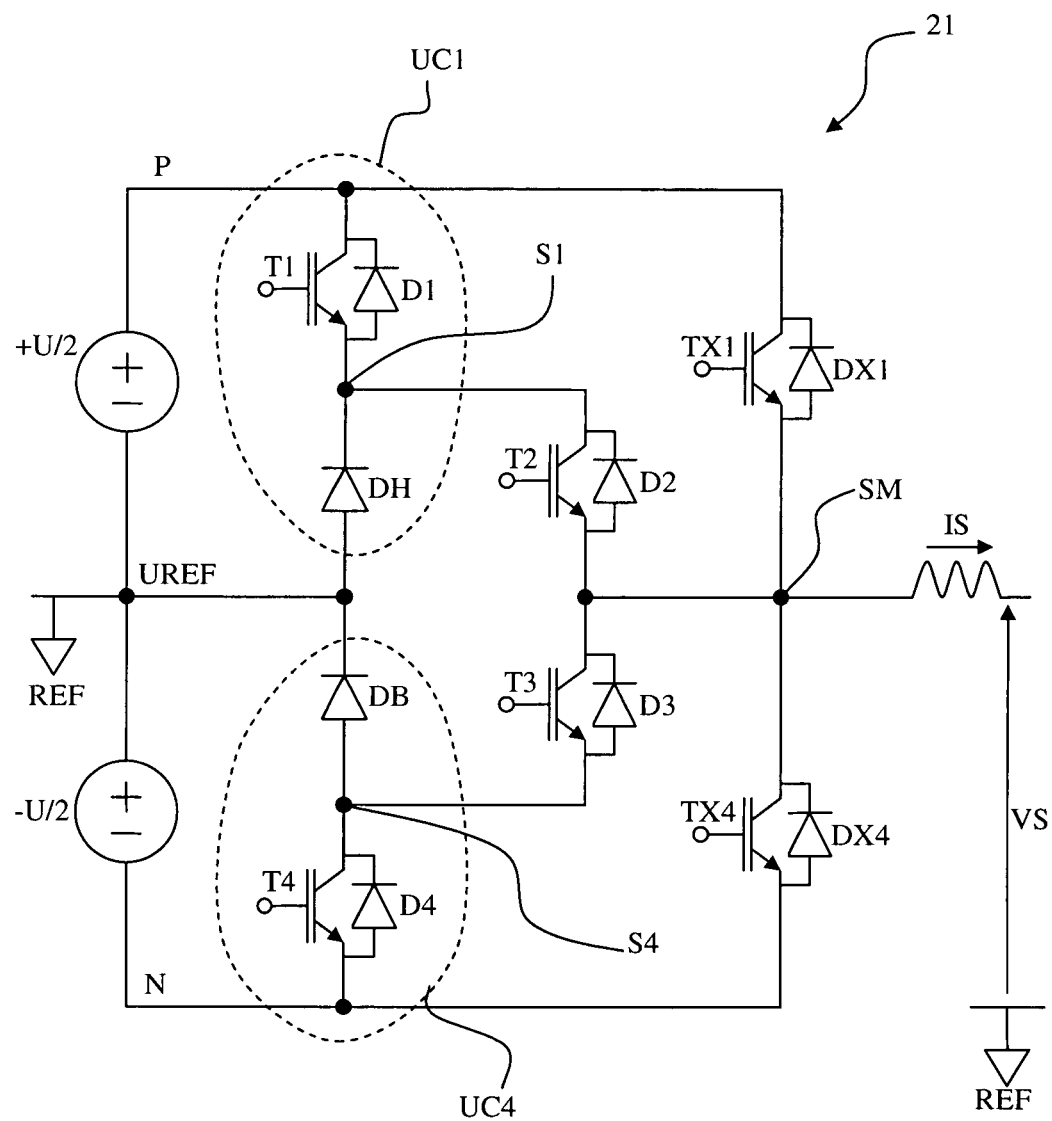
FIG. 3 represents a first embodiment of a converter device according to the invention.

With reference to FIG. 3, the converter device represented under reference number 21 comprises the same components as those of the inverter represented in FIG. 2, and these components are referenced in the same way. For each switching unit UC1, UC4, converter device 21 further comprises a third switch TX1, TX4 connected between the input P, N of said switching unit and the modulated signal output SM. More precisely, the third switch TX1, TX4 is connected directly between the input P, N of said switching unit and the modulated signal output SM. The first, second and third switches are each provided with transistors. In the following, for enhanced clarity, the switches will be able to be referenced in the same way as the transistors which they comprise.

In the embodiment represented in FIG. 3, transistors T1, T2, T3, T4, TX1, TX4 of the first, second and third switches are insulated gate bipolar transistors IGBT. Each switch comprises a diode D1, D2, D3, D4, DX1, DX4 connected in parallel on transistor T1, T2, T3, T4, TX1, TX4 of said switch and directed so as to be on when said transistor is reverse-biased. These diodes D1, D2, D3, D4, DX1, DX4 enable operation of the converter device during the reactive phases, i.e. when the AC voltage VS and AC current IS have opposite signs.

The first switch T1, T4 of each control unit UC1, UC4 is controlled so as to switch from the first to the second switched state, in one direction or the other, keeping the third switch TX1, TX4 open. The third switch TX1, TX4 of each control unit UC1, UC4 is for its part controlled to be closed in order to transfer the power between the input P, N and the modulated signal output SM during at least a part of the time during which said switching unit is in the first switched state. In this way, transfer of power by means of third switch TX1, TX4 is accompanied by a voltage drop only at the terminals of said third switch. By performing power transfer by means of third switch TX1, TX4 over a large part of the duration of the first switched state, power losses are thereby reduced by obtaining a voltage drop in one switch only instead of two.

In addition, switchings of transistors TX1, TX4 being performed under an almost zero voltage, the switching power losses of these transistors are very low. This feature therefore enables transistors TX1, TX4 and/or the cooling means of these transistors to be under-dimensioned. Advantageously, the control means are designed to turn transistors T1, T4 on before turn-on of transistors TX1, TX4. When transistors TX1, TX4 are turned on, the voltage at their terminals is therefore almost zero, about a few volts. The same reasoning applies to turn-off of transistors TX1, TX4, which is performed before turn-off of transistors T1, T4.

Figure 4:
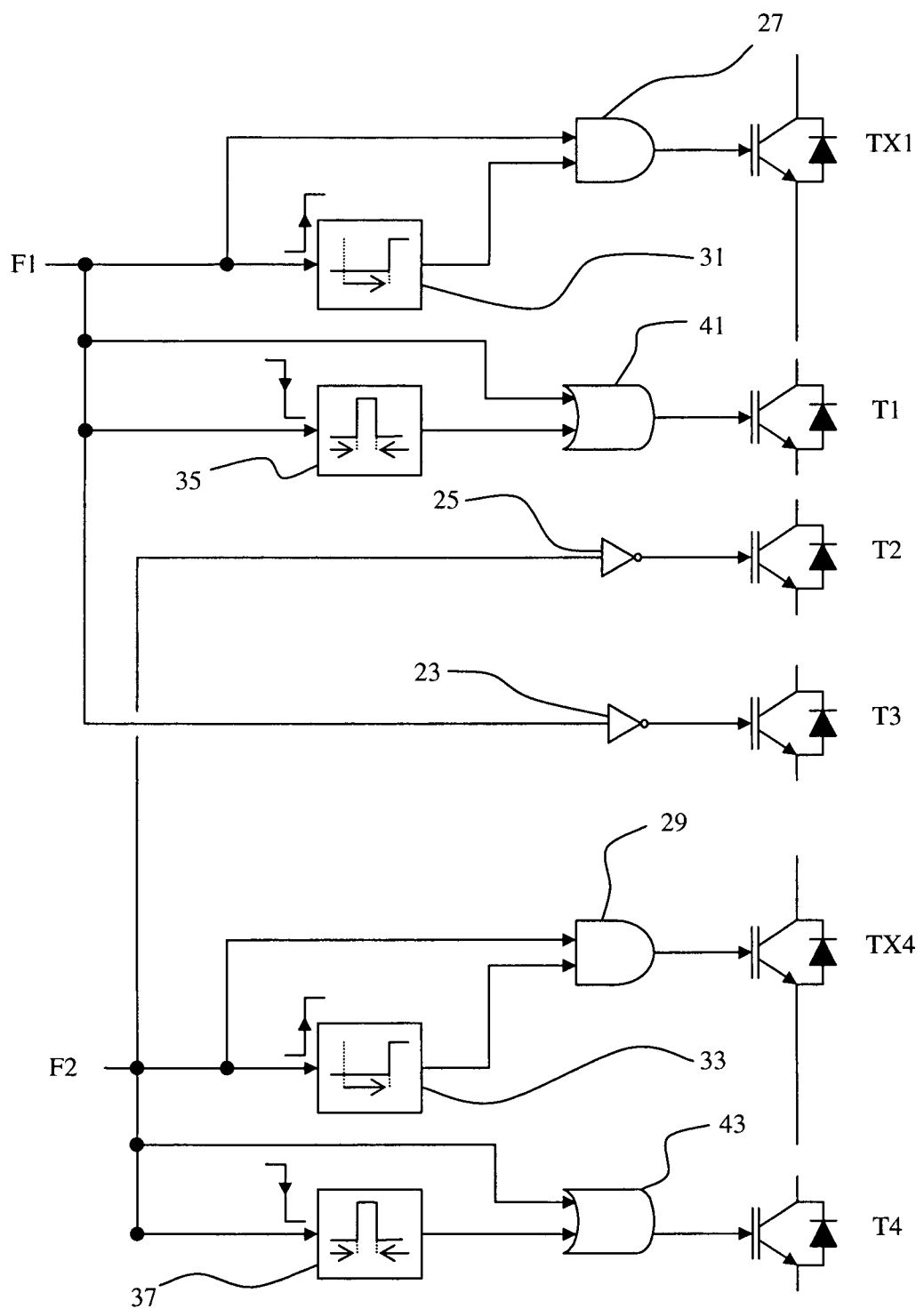
FIG. 4 represents the control unit of a converter device according to the invention.

An example of a control unit to control the first, second and third switches T1, T2, T3, T4, TX1, TX4 is described in the following with reference to FIG. 4. The transistors of the first, second and third switches are controlled from pulse width modulation signals F1, F2. The latter can be obtained by means of software implemented on a micro-controller. The pulse width modulation signals F1, F2 are generally high-frequency signals, up to about 100 kHz for example. The pulse width modulation signals F1, F2 are generally determined according to AC voltage VS. FIG. 4 represents the processing modules arranged between the inputs of pulse width modulation signals F1, F2 and the control inputs of transistors T1, T2, T3, T4, TX1, TX4. The control signals applied to the control input of transistors T1, T2, T3, T4, TX1, TX4 are, in the same way as pulse width modulation signals F1, F2, discrete logic signals, i.e. signals having an amplitude able to be equal to zero or one. When the amplitude of the control signal applied on the control input of a transistor is equal to zero, said transistor is off, and when this amplitude is equal to one, said transistor is on.

As far as control of transistors T1, T4 of the first switches is concerned, the pulse width modulation signal F1, respectively F2, is applied to the control input of transistor T1, respectively T4, by means of a logic disjunction module, i.e. a logic "OR" module. When the AC voltage VS is positive, respectively negative, turn-on of transistor T1, respectively T4, supplies a voltage on switching output S1, respectively S4, the amplitude of which voltage is equal to the positive DC voltage +U/2, respectively negative DC voltage −U/2, which corresponds to the first switched state of switching unit UC1, respectively UC4. In the same way, when the AC voltage VS is positive, respectively negative, turn-off of transistor T1, respectively T4, turns diode DH, respectively DB, on, supplying a voltage on switching output S1, respectively S4, the amplitude of which voltage is equal to zero, which corresponds to the second switched state of switching unit UC1, UC4. This succession of turn-ons and turn-offs applied on transistor T1, respectively T4, thereby enables pulses of variable width having an amplitude substantially equal to the DC voltage U/2 and having a positive, respectively negative, sign to be obtained on switching output S1, respectively S4.

As far as control of transistor T2, T3 of the second switch of each switching unit UC1, UC4 is concerned, it is designed to activate switching of said switching unit according to the sign of the AC voltage VS turning said transistor on. More precisely, transistor T2, T3 of each switching unit UC1, UC4 enables the pulses to be transferred from switching output S1, S4 of said switching unit to the modulated signal output SM of the converter device when the AC voltage VS is of the same sign as the voltage available on input P, N of said switching unit. For this, the control unit comprises an inverting switch 23 and an inverting switch 25 connected between the input of pulse width modulation signal F1, respectively F2, and the control input of transistor T3, respectively T2. In this way, pulse width modulation signal F1, respectively F2, is inverted before being applied on the control input of transistor T3, respectively T2. Thus, when AC voltage VS is positive, respectively negative, pulse width modulation signal F2, respectively F1, is equal to zero and the control signal on output from inverting switch 23, respectively 25, is therefore equal to one. This has the result that when AC voltage VS is positive, transistor T2 is on, so that switching output SI of the switching unit UC1 is connected to the modulated signal output SM. In the same way, when AC voltage VS is negative, it is transistor T3 which is on, so that switching output S4 of switching unit UC4 is connected to the modulated signal output SM. By means of these inverters 23, 25, it is possible to supply pulses of variable width, on the modulated signal output SM, with an amplitude substantially equal to DC voltage U/2 and having a sign identical to the sign of AC voltage VS. In other words these inverting switches 23, 25 enable switching output S1, S4 of switching unit UC1, UC4 to be connected to the modulated signal output SM, when the sign of the AC voltage VS is the same as that of the voltage available on the voltage input of said switching unit. Consecutive filtering of these pulses obtained on the modulated signal output SM, by means of inductance L and a capacitor, not represented, thereby enables an AC voltage VS having a defined shape, for example sine wave, to be supplied.

As far as control of transistor TX1, TX4 of the third switch of each switching unit UC1, UC4 is concerned, it is designed to keep said third switch open during switching from the first switched state to the second switched state, and to close said third switch during at least a part of the duration of said first switched state. For this, pulse width modulation signal F1, respectively F2, is applied to the control input of transistor TX1, respectively TX4, by means of a logic conjunction module 27, 29, i.e. a logic "AND" module. Concerning transistor TX1, one of the inputs of logic conjunction module 27 is directly connected to the input of pulse width modulation signal F1, and the other input of said logic module is connected to the input of the pulse width modulation signal F1 by means of a delay module 31 active for the leading edges of said signal. In the same way, concerning transistor TX4, one of the inputs of logic conjunction module 29 is directly connected to the input of the pulse width modulation signal F2, and the other input of said logic module is connected to the input of the pulse width modulation signal F2 by means of a delay module 33 also active for the leading edges of said signal.

In this way, when the pulse width modulation signal F1, respectively F2, switches from zero to one, transistor T1, respectively T4 of the first switch is turned on, which corresponds to switching from the second to the first switched state of switching unit UC1, respectively UC4. During this time, transistor TX1, respectively TX4, of the third switch is in a first stage kept turned-off by means of delay module 31, respectively 33, and logic conjunction module 27, respectively 29. After a period corresponding to the delay of delay module 31, respectively 33, the amplitude of the signals on the two inputs of logic conjunction module 27, respectively 29, are equal to one and transistor TX1, respectively TX4, of the third switch turns on. The impedance of transistor TX1, TX4 of the third switch being lower than the impedance in the circuit formed by transistor T1, T4 of the first switch in series with transistor T2, T3 of the second switch, a large part of the current between the DC voltage input P, N and the modulated signal output SM flows via transistor TX1, TX4 of the third switch. Power transfer between input P, N and modulated signal output SM therefore takes place with a minimized voltage drop. The use of the third switch thus enables power losses to be significantly reduced.

In the embodiment represented in FIG. 4, control of transistor T1, respectively T4, of the first switches of switching unit UC1, respectively UC4, is performed by means of a monostable module 35, respectively 37, connected between the input of pulse width modulation signal F1, respectively F2, and one of the inputs of logic disjunction module referenced 41, respectively 43, the other input of said logic disjunction module being directly connected to the input of pulse width modulation signal F1, respectively F2. The monostable module 35, 37 is active on the trailing edges of pulse width modulation signal F1, F2, and enables the state of its output to be changed after a predefined time delay. In this way, when pulse width modulation signal F1, respectively F2, switches from one to zero, transistor T1, respectively T4, of the first switch turns off after the predefined time delay to enable switching from the first to the second switched state of switching unit UC1, respectively UC4. During this time, transistor TX1, respectively TX4, of the third switch is off due to logic conjunction module 27, respectively 29. Switching from the first switched state to the second switched state, in one direction or the other, is thereby performed by means of transistor T1, T4 of the first switch, while at the same time keeping transistor TX1, TX4 of the third switch open. In this way, first switch T1, T4 is dedicated to switchings, i.e. going from the first switched state to the second switched state, in one direction or the other, whereas third switch TX1, TX4 is dedicated to power transfer between the DC voltage inputs P, N and the modulated signal output during a large part of the duration of the first switched states.

With reference to FIGS. 5A to 5F, operation of the converter device represented in FIG. 3 and associated with the control unit represented in FIG. 4 is described in the following. This description of operation essentially concerns switching of switching unit UC1 from the first to the second switched state, and switching from the second to the first switched state, i.e. when switching unit UC1 is activated. The person skilled in the trade can easily transpose this description of operation of switching unit UC1 to operation of switching unit UC4.

When the switching unit UC1 is activated, the amplitude of the pulse width modulation signal F2 is equal to zero, and transistor T2 of the second switch associated with said switching unit is turned on by means of inverting switch 25. Transistor T3 of the second switch associated with switching unit UC4 is for its part turned off by means of inverting switch 23, and said switching unit is therefore deactivated.

Figure 5:
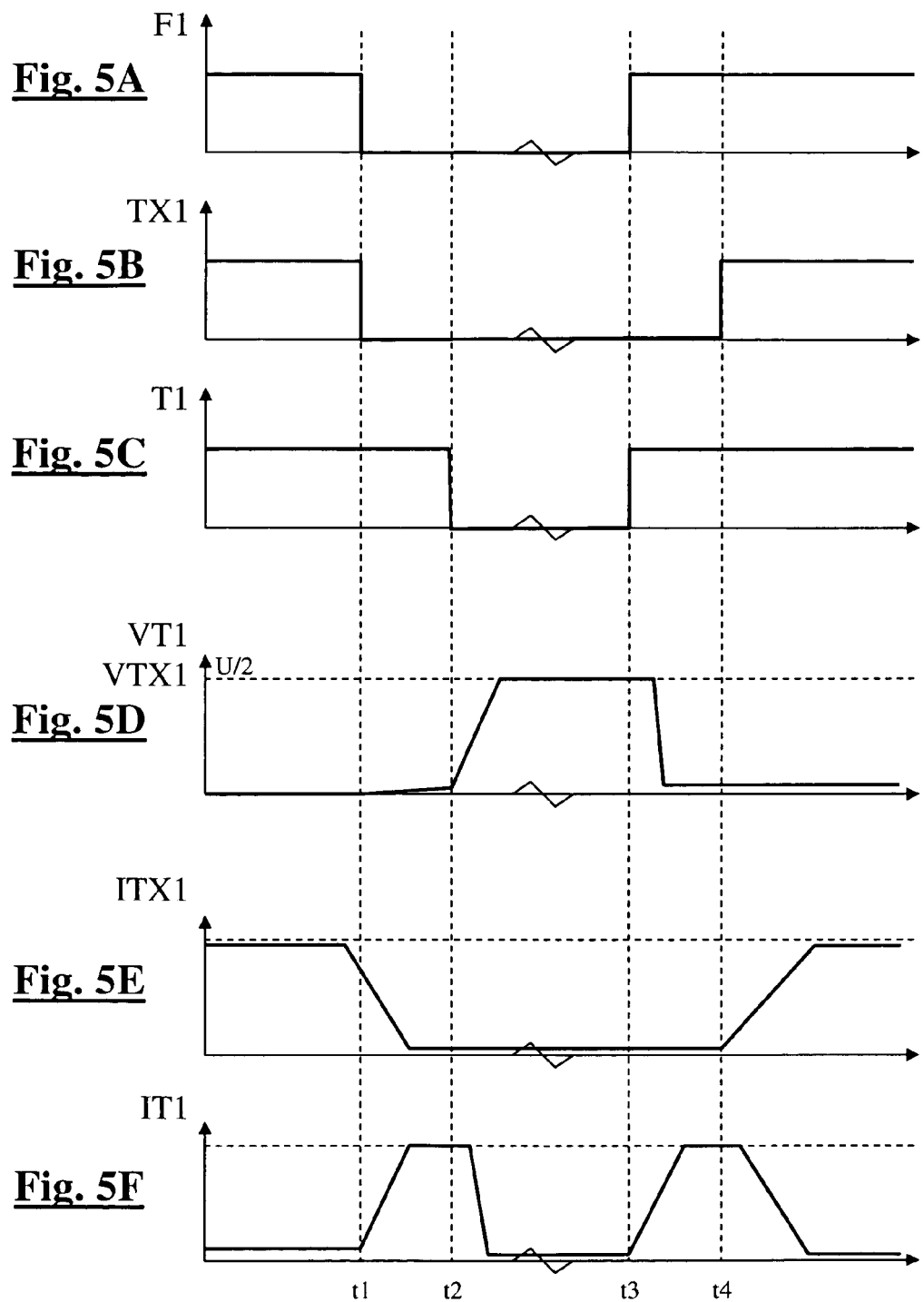
FIGS. 5A to 5F represent the variations in time of control signals, voltages and currents at different points of the converter device according to the invention.

So long as the amplitude of pulse width modulation signal F1 is equal to one, transistor T1 of the first switch and transistor TX1 of the third switch are on (FIGS. 5A, 5B and 5C). The value of the voltage on switching output S1 of switching unit UC1 is substantially equal to that of the voltage U/2 on the input P of said switching unit, which corresponds to the first switched state of said switching unit. Between the DC voltage input P and the modulated signal output SM, most of the current flows via transistor TX1 of the third switch due to the fact that its impedance is lower than that of the two series-connected transistors T1, T2 of the first and second switch. This results in the current ITX1 (FIG. 5E) flowing in third switch TX1 being much higher than current IT1 (FIG. 6E) flowing in first transistor T1. The power loss linked to the voltage drop in the transistors, i.e. essentially in transistor TX1 of the third switch, is reduced compared with a device of the type represented in FIG. 2 in which the whole of the current between DC voltage input P and modulated signal output SM flows in both of the transistors T1 and T2.

At a time t1, the amplitude of pulse width modulation signal F1 goes from one to zero, and transistor TX1 of the third switch turns off (FIGS. 5A and 5B) due to the fact that one of the inputs of conjunction module 27 goes to zero. Turn-off of transistor T1 of the first switch is postponed to a time t2 by means of monostable module 35 and of disjunction module 41 (FIG. 5C). This results in the current ITX1 (FIG. 5E) flowing in transistor TX1 of the third switch decreasing while the current IT1 (FIG. 5F) flowing in transistor T1 of the first switch increases. Before the time t2, almost all the current between the DC voltage input P and the modulated signal output SM flows through transistor T1 (FIG. 5F). The voltage on switching output S1 of switching unit UC1 is still substantially equal to the voltage U/2 on input P of said switching unit, which corresponds to the first switched state of said switching unit. Switching from the first to the second switched state will be achieved by means of transistor T1 of the first switch, whereas transistor TX1 of the third switch has been turned off beforehand.

It should be noted that the period between time t1 and t2 is very short, about one micro-second. Furthermore, monostable modules 35, 37 constitute simple means for ensuring that third switch TX1 is in fact open during switching from the first to the second switched state. However, in this simple and illustrative embodiment, a stagger exists between switching from the first to the second switched state of switching unit UC1, UC4 and zero crossing of the pulse width modulation signal F1, F2. This stagger creates a distortion between the switched state and the pulse width modulation signal F1, F2. In other embodiments which have not been represented, monostable modules 35, 37 can be replaced by means including counters, count-down counters and comparators enabling turn-off of transistor T1, T4 of the first switch to be anticipated at time t1, before the trailing edge of pulse width modulation signal F1, F2, which enables the turn-off order of transistor T1, T4 of the first switch to be synchronized with said pulse width modulation signal F1, F2. Such control means can be determined by a person skilled in the trade having the objective of preventing this problem of distortion between the turn-off order of transistor T1, T4 of the first switch and pulse width modulation signal F1, F2. Implementation of such a control unit would result in the amplitude of the pulse width modulation signal F1, F2 going from one to zero at time t1 instead of at time t2 without modifying the rest of the chronograms represented in FIGS. 5A to 5F.

Figure 1:
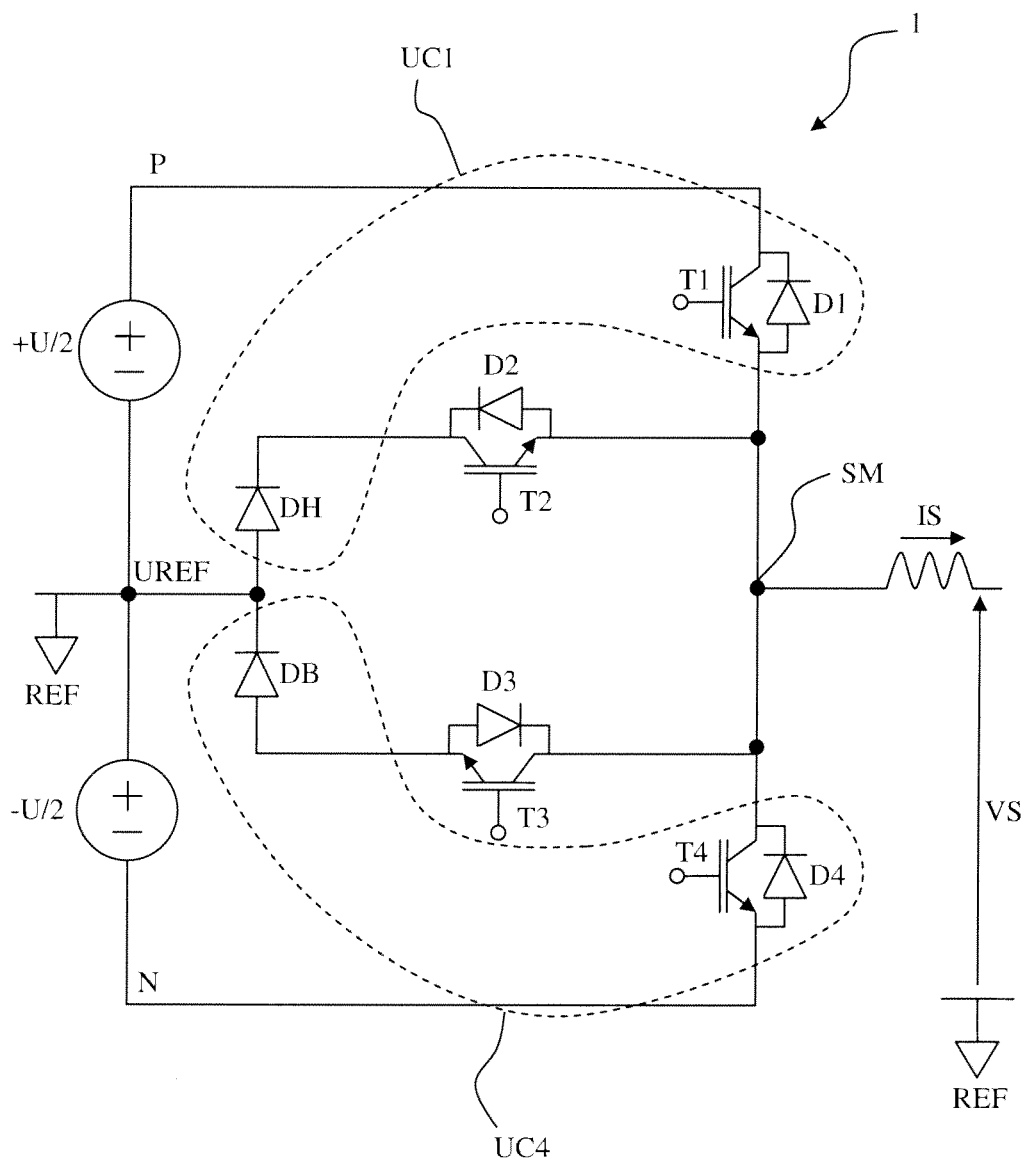
FIG. 1 represents a converter device according to the prior art.

At time t2, the transistor TX1 of the third switch is off, i.e. the third switch is open, and switching from the first to the second switched state is performed by means of transistor T1 of the first switch (FIG. 5C). Transistor T1 of the first switch is therefore off and the current between the DC voltage input P and the modulated signal output SM is cancelled out (FIG. 5F). The voltage at the terminals of transistors T1, TX1 of the first and third switch increases until it reaches a value substantially equal to the DC voltage U/2 on input P. The value of the voltage at the terminals of transistors T1 and TX1 of the first and second switch is reduced compared with that of the voltage at the terminals of transistor T1 of the inverter represented in FIG. 1, which would be equal to twice this first value, i.e. equal to the potential difference between the two inputs P, N. This results in the voltage rating of transistors T1, TX1 of converter device 21 being reduced compared with the rating of transistor T1 of inverter 1 represented in FIG. 1.

At a time t3, whereas transistor TX1 of the third switch is still off, i.e. the third switch is open, the amplitude of pulse width modulation signal F1 goes from zero to one and transistor T1 turns on due to disjunction module 41 (FIGS. 5A and 5C). The value of the voltage on switching output S1 of switching unit UC1 goes from zero to a value substantially equal to the voltage U/2 on input P of said switching unit, which corresponds to the first switched state of said switching unit. This results in a current IT1 (FIG. 5E) flowing between the DC voltage input P and modulated signal output SM, via transistor T1 of the first switch. Flow of this current IT1 leads to a voltage drop in the two transistors T1 and T2 of the first and second switch. In parallel, when the amplitude of pulse width modulation signal F1 goes from zero to one, delay module 31 is activated to delay turn-on of transistor TX1 of third switch.

At a time t4 corresponding to the time when the delay generated by delay module 31 has elapsed, transistor TX1 of the third switch is turned on, i.e. the third switch is closed. This results in most of the current flowing between the DC voltage input P and modulated signal output SM passing via transistor TX1 of the third switch on account of the fact that its impedance is lower than that of the two transistors of the series-connected first and second switch. The current ITX1 (FIG. 5E) flowing in third switch TX1 becomes much greater than the current IT1 (FIG. 6E) flowing in first transistor T1, which corresponds to the situation before time t1 described in the foregoing.

In the following, alternative embodiments of the converter device according to the invention have been described. Functioning of these other embodiments is essentially the same as that described in the foregoing.

Figure 6:
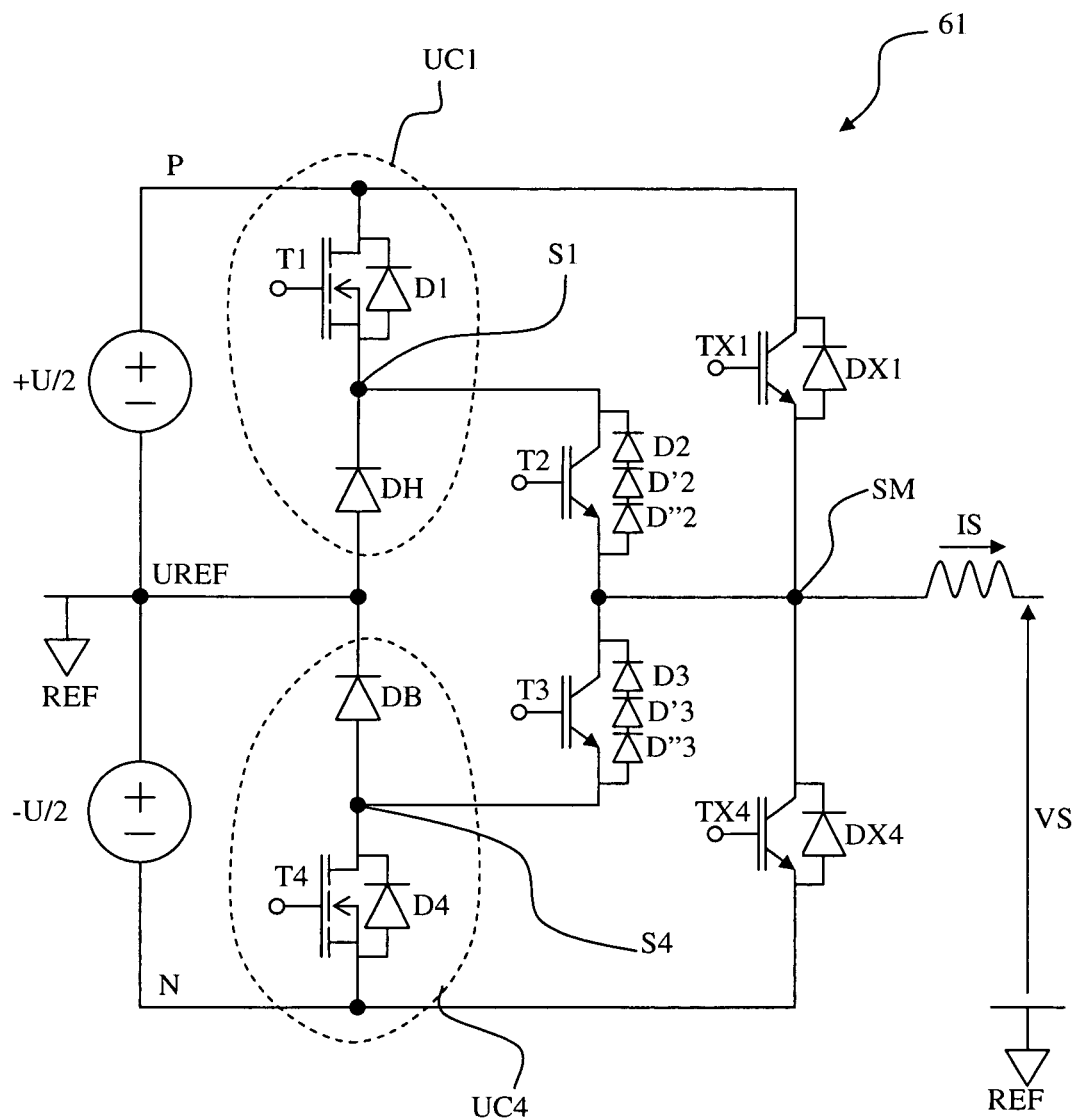
FIG. 6 represents a second embodiment of a converter device according to the invention.

In the converter device 61 represented in FIG. 6, transistors T1, T4 of the first switches are MOS field effect transistors which present better switching performances than the insulated gate bipolar transistors IGBT used in the first switches T1, T4 of the converter device 21 represented in FIG. 3. During the reactive phases, the diodes of the first, second and third switch of the activated switching unit UC1, UC4 turn on. The poor performances of diodes D1, D4 of the MOS field effect transistors of first switches T1, T4 on turn-off lead to high switching power losses. It is therefore advantageous to cancel the current flowing in diodes D1, D4 during the reactive phases. To do this, in the embodiment represented in FIG. 6, three diodes D2, D'2, D"2, D3, D'3, D"3 have been connected in parallel on transistor T2, T3 of the second switch of each switching unit UC1, UC4, and directed so as to be on when said transistor is reverse-biased. In this way, during the reactive phases, the voltage drop in diodes D2, D3 of the second switch is greater than the voltage drop in diode DX1, DX4 of the third switch. This results in the whole of the reactive current flowing between the modulated signal output SM and one or the other of the DC voltage inputs P, N flowing via diode DX1, DX4 of the third switch. Another advantage is that, during the reactive phases, the stray inductances due to the wiring are reduced, which limits transient voltage surges on turn-off of transistors T2, T3. During the reactive phases, the current in fact flows in diodes DX1, DX4. In the converter device of FIG. 2 according to the prior art, the current is conducted by two diodes instead of one, i.e. D1, D2 when first switching unit UC1 is activated, and D3, D4 when second switching unit UC4 is activated.

Figure 7:
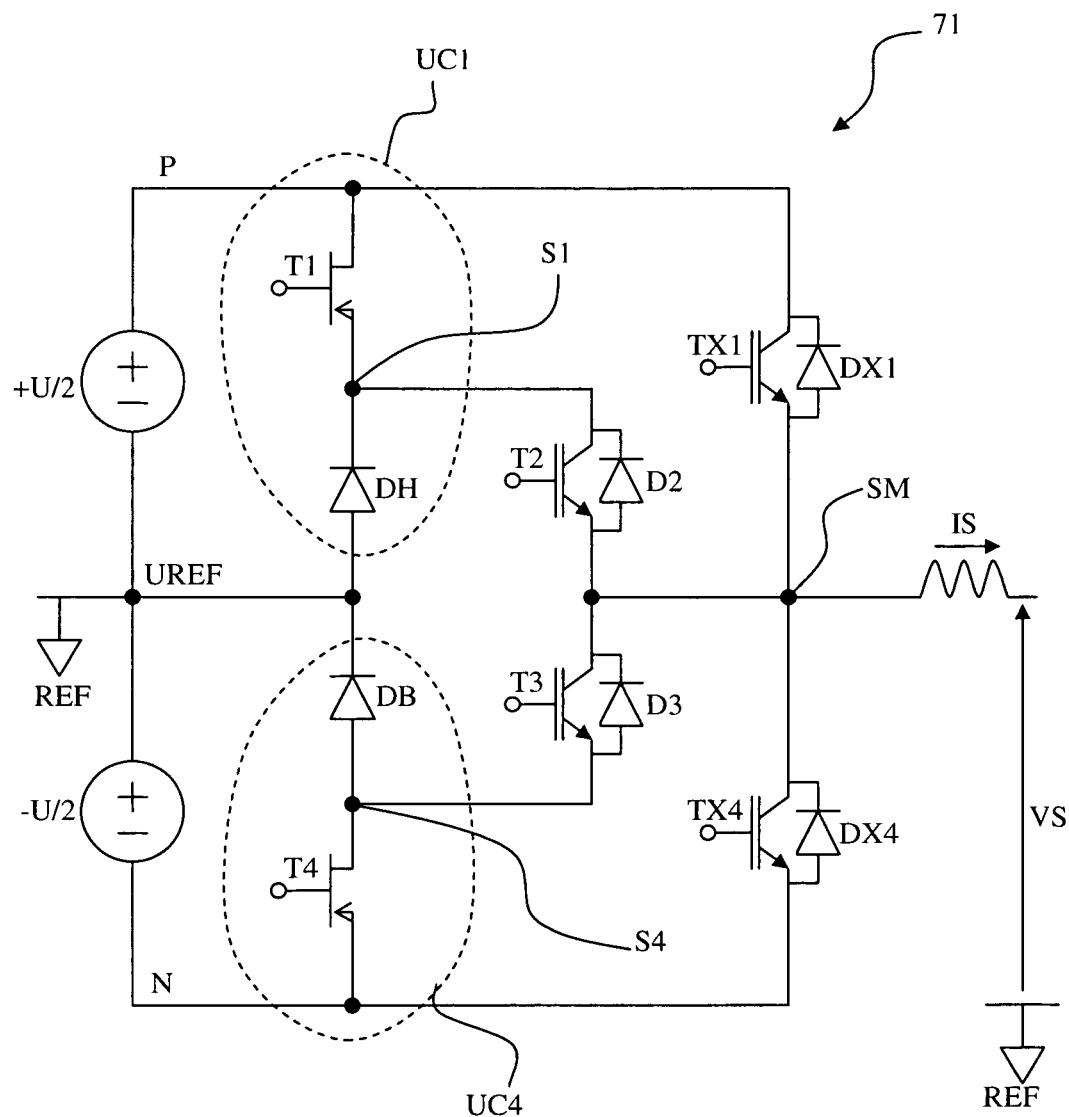
FIG. 7 represents a third mode embodiment of a converter device according to the invention.

In the converter device 71 represented in FIG. 7, transistors T1, T4 of the first switches are field effect transistors made from silicon carbide. Diodes DH, DB are also made from silicon carbide. In addition, diodes D1, D4 connected in parallel on transistors T1, T4 have been eliminated. In other embodiments that are not represented, diodes D1, D4 made from silicon carbide could be associated with transistors T1, T4. Compared with a MOS field effect transistor, the use of a field effect transistor made from silicon carbide enables the switching speed to be increased, the voltage withstand to be improved and the intrinsic stray diode of said transistor to be eliminated. Furthermore, the position of the field effect transistors in the set-up of FIG. 7 enables transistors of normally ON type or transistors of normally OFF type to be used.

Figure 8:
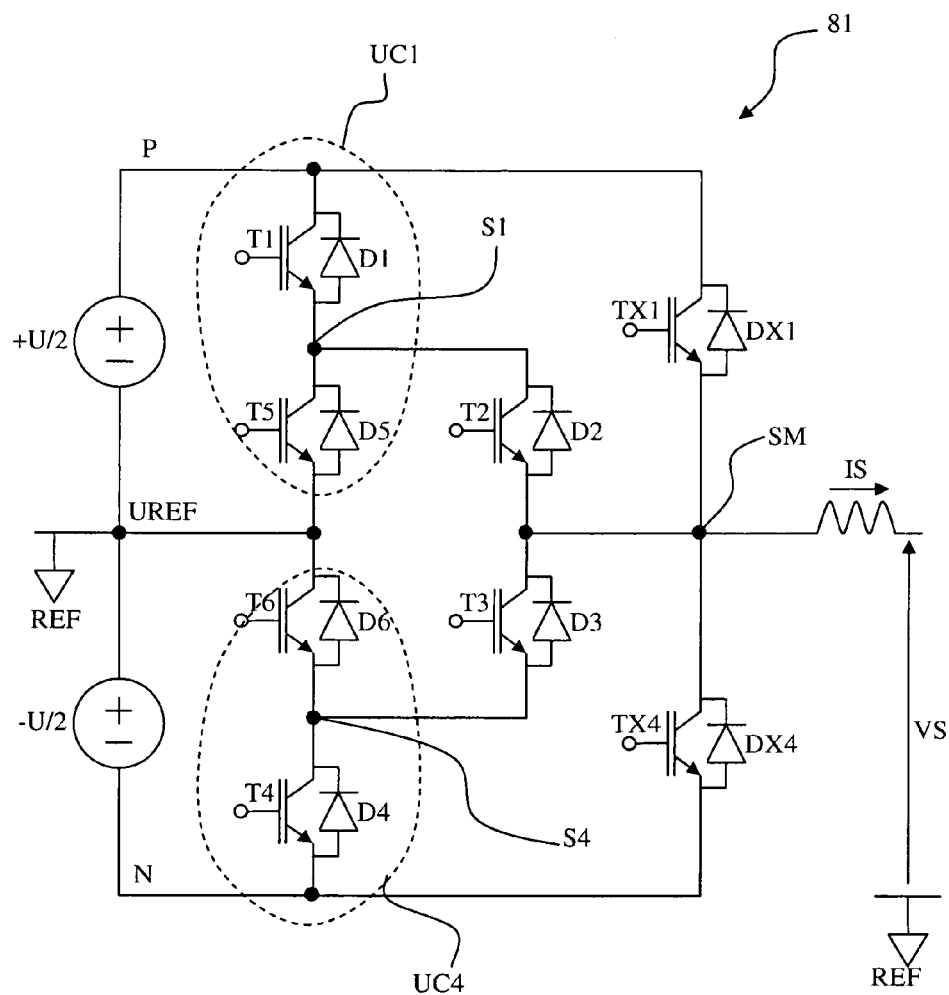
FIG. 8 represents a fourth embodiment of a converter device according to the invention.

In the converter device 81 represented in FIG. 8, transistors T1, T4 of the first switches are insulated gate bipolar transistors IGBT. Diodes DH and DB have moreover been replaced by fourth switches, each of said fourth switches comprising an insulated gate bipolar transistor IGBT T5, T6 and a diode D5, D6 connected in parallel on said transistor and directed so as to be on when said transistor is reverse-biased. The voltage rating of transistors T5, T6 is, in the same way as that of transistors T2, T3, equal to one half of the rating of transistors T2, T3 of the converter device 21 represented in FIG. 3.

Transistors T1, T4, T5, T6, TX1, TX4 generally switch at the switching frequency and operate according to the same principle as in the case of converter device 21. Unlike converter device 21, transistors T2, T3 no longer switch at the switching frequency but operate in changeover mode, i.e. they switch at the frequency of output voltage VS, which is generally equal to 50 to 60 Hz.

One of the advantages of converter device 81 is that it facilitates power ramping due to standard power modules. The assembly comprising first switch T1, T4 and fourth switch T5, T6 of each switching unit UC1, UC4 is in fact essentially formed by a conventional half-bridge power module. The same is the case for the assembly comprising second switch T2, T3 and third switch TX1, TX4 of each switching unit UC1, UC4. As fourth switch T5, T6 of each switching unit UC1, UC4 is bidirectional in current, switching between the DC voltage input P, N and reference voltage line REF, in either direction, is performed essentially in the power modules, both for the active phases and for the reactive phases. The size of the circuit in which the switchings are performed is thereby reduced, and the presence of voltage surges linked to stray inductances and to strong current is better controlled and confined in a single switching module using only two switches, i.e. first switch T1, T4 and fourth switch T5, T6.

The converter device 81 represented in FIG. 8 also enables the distribution of losses in the different semi-conductor components, for which the power factor and output voltage VS are variable, to be homogenized, as is the case in standard uninterruptible power supplies, in motor applications such as variable frequency and/or voltage regulators.

Figure 9:
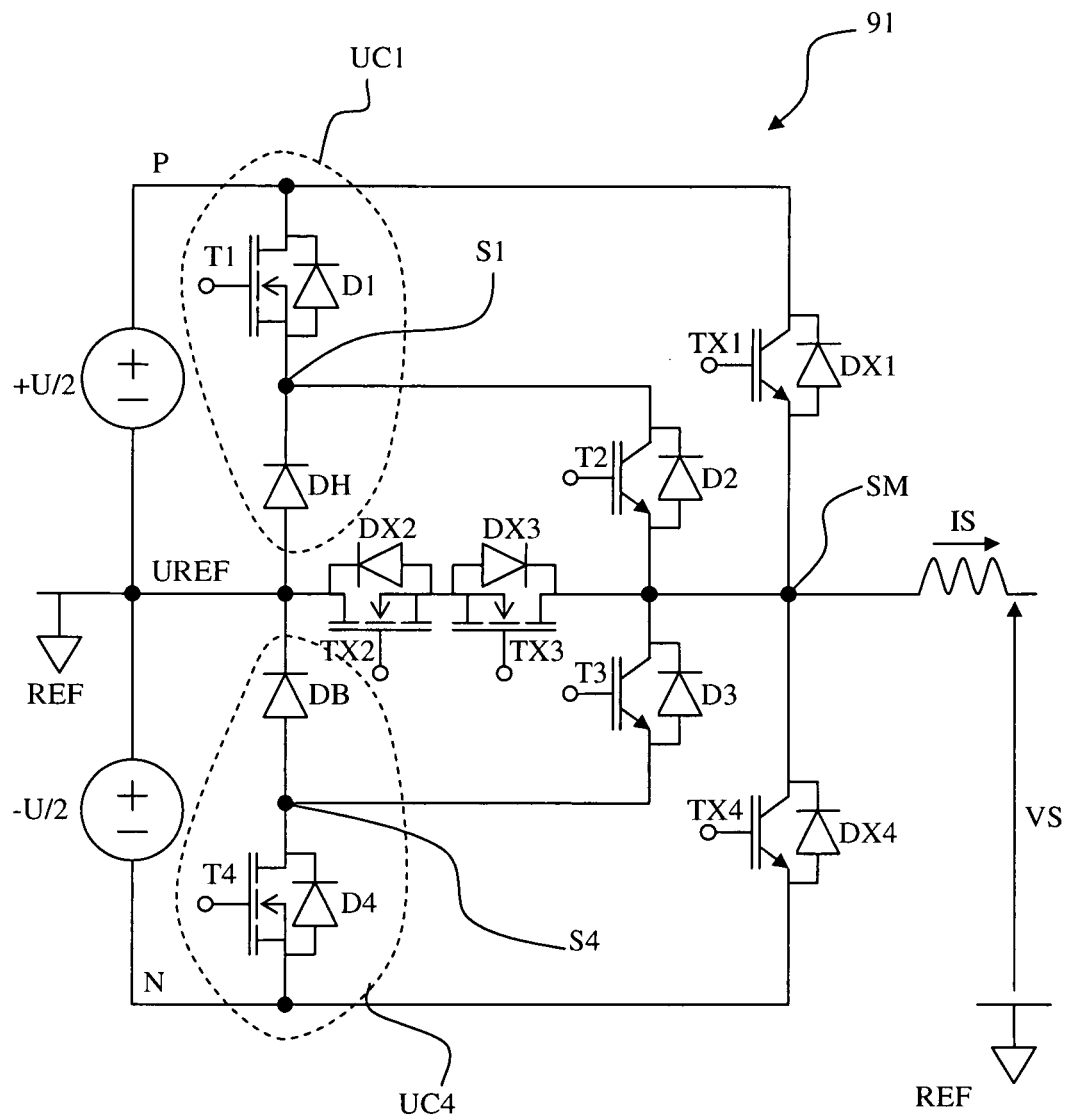
FIG. 9 represents a fifth embodiment of a converter device according to the invention.

In the converter device 91 represented in FIG. 9, a fifth switch TX2, TX3 is connected between reference voltage line REF and modulated signal output SM. This fifth switch comprises two MOS field effect transistors TX2, TX3 connected in series and directed so as to conduct the current in opposite directions, said fifth switch comprising, for each of two said transistors, a diode DX2, DX3 connected in parallel on said transistor and directed so as to be on when said transistor is reverse-biased. Transistors TX2, TX3 are controlled to enhance switching of transistors T2, T3 of the second switches.

The converter device 91 represented in FIG. 9 enables switching losses to be reduced in applications for which the power factor of the load is very different from one, such as for example in the reactive power compensators and in active filters. Switching to closing of transistor T2, T3 of the second switch of each switching unit UC1, UC4 is preceded by closing of transistor TX2, TX3 of the fifth switch of said switching unit. On opening of transistor T2, T3 of the second switch of each switching unit UC1, UC4, transistors TX2, TX3 of the fifth switch of said switching unit remain closed during the time switching of second switch T2, T3 takes place and then open. Advantage is thereby taken of the switching performances of MOS field effect transistors and of the small voltage drop in IGBT transistors during turn-on.

Figure 10:
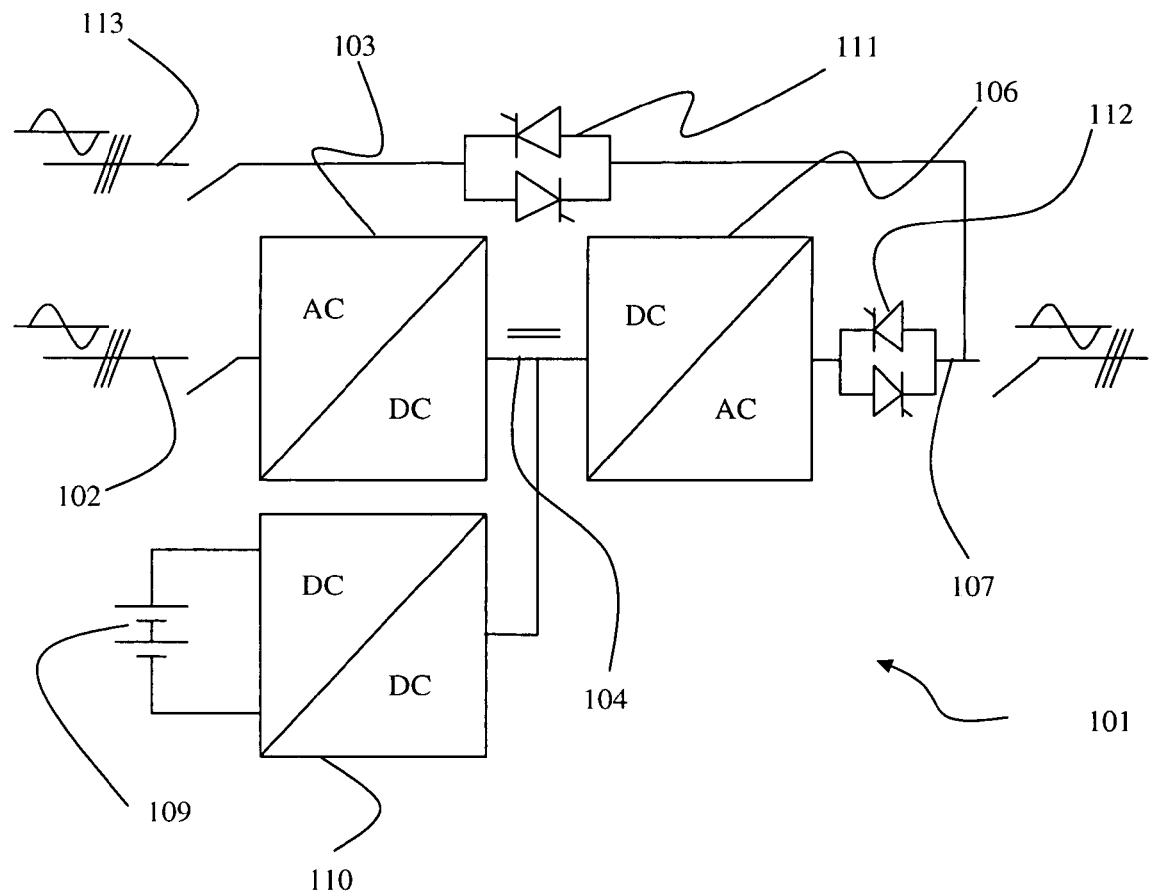
FIG. 10 represents an uninterruptible power supply comprising a converter device according to the invention.

The converter devices described in the foregoing can be used in an uninterruptible power supply 101 such as the one represented in FIG. 10. This uninterruptible power supply comprises a power supply input 102 on which a variable input voltage from a first three-phase power system is applied. The uninterruptible power supply comprises a rectifier 103, said rectifier being connected on the one hand to power supply input 102 and on the other hand to two substantially DC voltage output lines 104 or busses. The uninterruptible power supply comprises an inverter 106 corresponding to one of the converter devices described in the foregoing, said inverter being connected between output lines 104 and an output 107 designed to supply a secured three-phase AC voltage to a load. DC voltage bus 104 is also connected to a battery 109 via a DC/DC converter 110.

As can be seen in FIG. 10, selection between the power supply input 102 of the first three-phase power system and a power supply input 113 of a second power system which is also three-phase can be made by means of static switches 111 and 112. It is thereby possible to supply the load via the first secured power system by uninterruptible power supply 101, and to switch over to the second power system if required.

The invention claimed is:

1. A converter device for enabling an AC voltage and current to be supplied by filtering pulses on a modulated signal output from three substantially DC voltages available, respectively, on a reference voltage line, and on two DC voltage inputs of opposite signs from two switching units, said device comprising:
 a reference voltage line;
 a modulated signal output;
 two switching units, each of said switching units comprising: an input, a switching output, and a first switch connected between said input and said switching output, said switching unit being in a first switched state when said first switch is closed;
 a second switch associated with each switching unit and connected between said associated switching unit and the modulated signal output, for activating said switching unit by closing said second switch;

a third switch associated with each of said switching units and connected between said associated switching unit and the modulated signal output;

the output of each of said switching units for supplying pulses having an amplitude varying between the level of the voltage on the input of that switching unit when that switching unit is in said first state, and the level of a voltage on said reference voltage line when that switching unit is in a second state in which the first switch of that switching unit is open;

wherein when the first switch of that switching unit is switched from said first state to said second state while the third switch of that switching unit remains open, said third switch remaining open during at least a portion of the duration of said first state.

2. The device according to claim 1, wherein each switching unit further comprises a diode connected between the reference voltage line and the switching output of said switching unit to establish the second switched state when the first switch is open.

3. The device according to claim 1, wherein each switching unit further comprises a fourth switch connected between the reference voltage line and the switching output of said switching unit to establish the second switched state when the first switch is open.

4. The device according to claim 3, wherein the fourth switch of each switching unit comprises a transistor and a diode connected in parallel on said transistor and directed to be on when said transistor is reverse-biased.

5. The device according to claim 1, wherein the second switch associated with each switching unit is between the switching output of said switching unit and the modulated signal output.

6. The device according to claim 1, wherein the first, second and third switches comprise transistors.

7. The device according to claim 6, wherein the first, second and third switches comprise diodes connected, respectively, in parallel with each of the transistors of said switches, and directed to be on when said transistor is reverse-biased.

8. The device according to claim 7, wherein the transistors of the first, second and third switches are insulated gate bipolar transistors.

9. The device according to claim 6, wherein the transistors of the first switches are silicon carbide field effect transistors, and the second and third switches comprise diodes connected, respectively, in parallel with each of the transistors of said switches and directed to be on when said transistor is reverse-biased.

10. The device according to claim 7, wherein the transistor of the first switch of each switching unit is a MOS field effect transistor, the second switch associated with said switching unit comprising a plurality of series-connected diodes in parallel with the transistor of said second switch and directed to be on when said transistor is reverse-biased.

11. The device according to claim 7, comprising a fifth switch connected between the reference voltage line and the modulated signal output.

12. The device according to claim 11, wherein the fifth switch comprises two MOS field effect transistors connected in series and directed to conduct current in opposite directions, said fifth switch comprising, for each of said two transistors, a diode connected in parallel on each said transistor and directed to be on when said transistor is reverse-biased.

13. The device according to claim 1, comprising for each switching unit:

first control means acting on the first switch of said switching unit to close or open said first switch to switch from the first switched state to the second switched state, while keeping the third switch open, and second control means acting on the third switch of said switching unit to close said third switch after switching from the second switched state to the first switched state.

14. A converter device according to claim 1 in combination with additional elements, for outputting a secured AC voltage as an uninterruptible power supply, said additional elements comprising a rectifier having an AC input and a plurality of DC outputs, and two electrically conductive lines connected to said device for supplying DC voltages of opposite signs to said device from outputs of the rectifier having an AC input.

* * * * *